US007976788B2

(12) United States Patent
Drost et al.

(10) Patent No.: US 7,976,788 B2
(45) Date of Patent: Jul. 12, 2011

(54) DETACHABLE DECOMPOSITION REACTOR WITH AN INTEGRAL MIXER

(75) Inventors: Jason Drost, Edgerton, WI (US); Diane Boose, Nashville, IN (US); Robert Schellin, Stoughton, WI (US); Achuth Munnannur, Stoughton, WI (US); Mihai Chiruta, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 338 days.

(21) Appl. No.: 12/252,689

(22) Filed: Oct. 16, 2008

(65) Prior Publication Data

US 2010/0098604 A1 Apr. 22, 2010

(51) Int. Cl.
*B01J 19/08* (2006.01)
*F01N 1/00* (2006.01)

(52) U.S. Cl. .......... 422/225; 422/168; 422/171; 60/272; 60/274; 60/282; 60/286; 60/295

(58) Field of Classification Search .................. 422/168, 422/171, 225; 60/272, 274, 282, 286, 295, 60/168, 171, 225
See application file for complete search history.

(56) References Cited

U.S. PATENT DOCUMENTS

| | | | | |
|---|---|---|---|---|
| 5,134,846 | A * | 8/1992 | White | 60/272 |
| 5,489,153 | A | 2/1996 | Berner et al. | |
| 5,976,475 | A | 11/1999 | Peter-Hoblyn et al. | |
| 6,401,449 | B1 | 6/2002 | Hofmann et al. | |
| 6,553,755 | B2 | 4/2003 | Hofmann et al. | |
| 6,761,025 | B1 | 7/2004 | Gladden | |
| 6,959,538 | B2 | 11/2005 | Cho et al. | |
| 7,380,395 | B2 | 6/2008 | Brück et al. | |
| 2004/0098971 | A1 | 5/2004 | Upadhyay et al. | |
| 2006/0233689 | A1 | 10/2006 | Hirata et al. | |
| 2007/0065349 | A1 * | 3/2007 | Merry | 422/179 |

(Continued)

FOREIGN PATENT DOCUMENTS

| | | |
|---|---|---|
| JP | 5-163933 | 6/1993 |
| JP | 2006-167576 | 6/2006 |
| JP | 2006-233846 | 9/2006 |

OTHER PUBLICATIONS

U.S. Appl. No. 12/237,574, filed Sep. 25, 2008.

(Continued)

*Primary Examiner* — Walter D Griffin
*Assistant Examiner* — Huy-Tram Nguyen
(74) *Attorney, Agent, or Firm* — Hamre, Schumann, Mueller & Larson, P.C.; J. Bruce Schelkopf

(57) ABSTRACT

A reductant decomposition reactor for use in exhaust systems is provided that includes a middle tube portion formed with a reductant injector mount, an inlet tube, an outlet tube and a mixer. The inlet tube is formed at a first end of the middle tube portion and the outlet tube is formed at a second end of the middle tube portion and both are configured to create a sealed connection to different portions of the exhaust system. The mixer fits between the middle tube portion and the outlet tube and is configured to decompose the reductant in an exhaust stream. The injector mount comprises a tube like section that connects at a first end to the middle tube portion and at a second end to an injector port of the injector mount, and is configured to reduce recirculation flow patterns in the reactor, create a high velocity flow at an inner surface of the injector mount and thereby reduce the formation of reductant deposits.

19 Claims, 7 Drawing Sheets

U.S. PATENT DOCUMENTS

| | | | | |
|---|---|---|---|---|
| 2007/0101703 | A1 | 5/2007 | Kanaya et al. | |
| 2007/0163241 | A1 * | 7/2007 | Meingast et al. | 60/286 |
| 2009/0084094 | A1 * | 4/2009 | Goss et al. | 60/301 |
| 2010/0132344 | A1 * | 6/2010 | Peters | 60/299 |

OTHER PUBLICATIONS

U.S. Appl. No. 12/364,048, filed Feb. 2, 2009.

International Search Report for corresponding patent application No. PCT/US2009/060585, dated May 3, 2010 (3 pages).

Written Opinion of the International Searching Authority for corresponding patent application No. PCT/US2009/060585, dated May 3, 2010 (3 pages).

International Search Report for international application No. PCT/US2010/022092, dated Aug. 25, 2010 (3 pages).

Written Opinion for international application No. PCT/US2010/022092, dated Aug. 25, 2010 (4 pages).

* cited by examiner

DETACHABLE DECOMPOSITION REACTOR WITH AN INTEGRAL MIXER

FIELD

This disclosure relates to the field of exhaust systems. More particularly, this description relates to a detachable decomposition reactor with an integral mixer for use in an exhaust system.

BACKGROUND

A common problem associated with the use of internal combustion engines is the formation of undesirable byproducts found in the exhaust stream, particularly nitrogen-oxides. After-treatment systems, such as selective catalytic reaction (SCR) systems, are used to lower the nitrogen-oxide content in the exhaust stream using urea and a reduction catalyst. In some SCR systems a urea decomposition reactor with a mixer is used to promote the decomposition of the urea into ammonia.

While detachable decomposition reactors within a SCR system are known, a majority of conventional decomposition reactors are typically formed as an integral part to the SCR system or are external reactors that are welded directly to the SCR system. Also, the reactor itself is formed by welding both an injector mount and a mixer directly to the inner tube of the decomposition reactor. As a result, conventional decomposition reactors suffer from poor heat retention within the reactor and are formed with welding distortions that result in the formation of reductant deposits within the reactor.

SUMMARY

This application describes a reductant decomposition reactor for use in exhaust systems. In one embodiment, the reactor includes a middle tube portion formed with a reductant injector mount, an inlet tube, an outlet tube and a mixer. The inlet tube is formed at a first end of the middle tube portion and is configured to create a sealed connection to a first portion of an exhaust system. The outlet tube is formed at a second end of the middle tube portion and is configured to create a sealed connection to a second portion of the exhaust system. The mixer fits between the middle tube portion and the outlet tube and is configured to decompose the reductant in an exhaust stream. The injector mount comprises a tube like section that connects at a first end to the middle tube portion and at a second end to an injector port of the injector mount and is configured to create high temperature, high velocity exhaust flow at the inner surface of the injector mount to reduce the formation of reductant deposits.

In another embodiment, the reactor includes a middle tube portion formed with a reductant injector mount, an inlet tube, an outlet tube and a mixer. The inlet tube is formed at a first end of the middle tube portion and is configured to create a sealed connection to a first portion of an exhaust system. The outlet tube is formed at a second end of the middle tube portion and is configured to create a sealed connection to a second portion of the exhaust system. The mixer fits between the middle tube portion and the outlet tube and is configured to decompose the reductant in an exhaust stream. The reactor further includes an insulating layer surrounding an outer surface of the middle tube portion and a portion of the inlet tube and a portion of the outlet tube. The insulating layer retains heat within the reactor in order to promote decomposition of reductant and to mitigate the formation of reductant deposits.

In yet another embodiment, the reactor includes a middle tube portion formed with a reductant injector mount, an inlet tube, an outlet tube and a mixer. The inlet tube is formed at a first end of the middle tube portion and is configured to create a sealed connection to a first portion of an exhaust system. The outlet tube is formed at a second end of the middle tube portion and is configured to create a sealed connection to a second portion of the exhaust system. The mixer fits between the middle tube portion and the outlet tube and is configured to decompose the reductant in an exhaust stream. The reactor further includes a tube like section in the injector mount that connects at a first end at an injector port and at a second end to the middle tube portion and is configured to create high temperature, high velocity exhaust flow at the inner surface of the injector mount to reduce the formation of reductant deposits.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice what is claimed, and it is to be understood that other embodiments may be utilized without departing from the spirit and scope of the claims. The following detailed description is, therefore, not to be taken in a limiting sense.

The embodiments presented herein are directed to a detachable reductant decomposition reactor with an integral mixer to be placed in a SCR exhaust system. The reactor includes a reductant injector mount that is configured to efficiently provide reductant into the SCR exhaust system, while avoiding the formation of reductant deposits within the reactor. The mixer is oriented within the reactor so as to be capable of decomposing nitrogen-oxide reductant in the exhaust stream as the exhaust stream flows through the decomposition reactor. The reactor also includes an insulating layer and heat shields to retain heat within the reactor in order to aid in the decomposition of the reductant and to mitigate the formation of reductant deposits.

Figure 1:
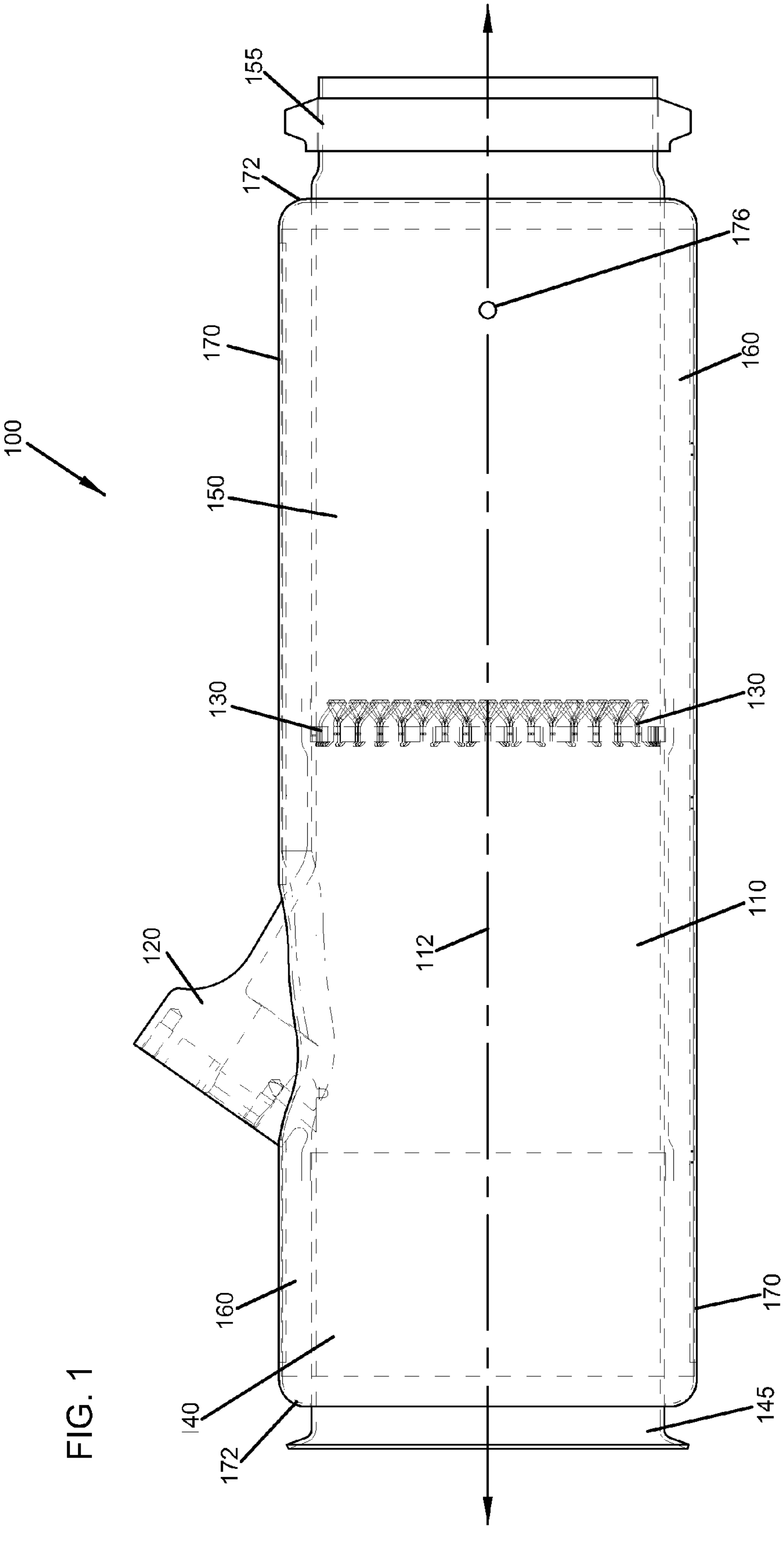
FIG. 1 is a side view of a detachable reductant decomposition reactor formed using a welding method.

FIG. 1 is a side view of a detachable reductant decomposition reactor 100 formed using a welding method. The reactor 100 includes a middle tube portion 110, a reductant injector mount 120, an inlet tube 140 and an outlet tube 150. The reactor 100 also includes a mixer 130 placed between the outlet tube 150 and an end of the middle tube portion 110. The middle tube portion 110 is formed with the injector mount 120, thereby avoiding distortions in the reactor 100 that result from welding an external injector mount to the middle tube portion 110. The inlet tube 140 and the outlet tube 150 are welded to the middle tube portion 110 to allow the reactor 100 to be configured to meet any type of connection configuration to the SCR exhaust system. The reactor 100 includes an insulating layer 160 surrounding an outer surface of the middle tube portion 110, a portion of the inlet tube 140 and a portion of the outlet tube 150. The insulating layer 160 is protected using heat shields 170. The injector mount 120 and the mixer 130 are oriented in ideal locations relative to each other in order to provide optimal reductant decomposition without the formation of reductant deposits within the reactor 100. In particular, the injector mount 120 and the mixer 130 are oriented to aim the reductant sprayed into the reactor 100 via the injector mount 120 to a center of the mixer 130. The middle tube portion 110, the mixer 130 and the outlet tube 150 are made from the same material or materials with similar coefficients of thermal expansion.

As discussed above, the middle tube portion 110, the mixer 130 and the outlet tube 150 are formed with the same material or materials with similar coefficients of thermal expansion. This allows the middle tube portion, the mixer 130 and the outlet tube 150 to have the same thermal expansion and contraction when the reactor 100 is used in an aftertreatment system. This allows the mixer 130 to expand and contract more freely within the reactor 100 without causing excessive stresses on the reactor 100 when a comparatively cold reactant is sprayed on the comparatively hot mixer 130. The mixer 130 includes mixer blades (not shown) used for decomposing nitrogen-oxide reductant from the exhaust stream traveling through the decomposition reactor 110. In the embodiment of FIG. 1, the mixer 130 and the outlet tube 150 are formed with 16 gauge 904L stainless steel. This material has a high content of alloying materials that provide superior corrosion and erosion prevention characteristics when placed in a decomposition reactor or any similar environment that is highly corrosive and subject to high temperatures, cyclic temperatures, etc.

The inlet tube 140 includes an inlet connection 145 for creating a sealable connection between the reactor 100 and one end of the aftertreatment system. In the embodiment of FIG. 1, the inlet connection 145 is a marmon joint. In other embodiments, the inlet connection 145 can be other types of gasket joints to mate with and create a sealed connection with the aftertreatment system. The inlet tube 140 is made from a lower cost material, such as 16 gauge 316L stainless steel, as the inlet tube 140 does not have direct contact with the reductant.

The outlet tube 150 includes an outlet connection 155 for creating a sealable connection between the reactor 100 and another end of the aftertreatment system. In the embodiment of FIG. 1, the outlet connection 155 is a marmon joint. In other embodiments, the outlet connection 155 can be other types of gasket joints to mate with and create a sealed connection with the aftertreatment system. As stated above, the outlet tube 150 is configured to match the material used to form the mixer 130.

Figure 2:
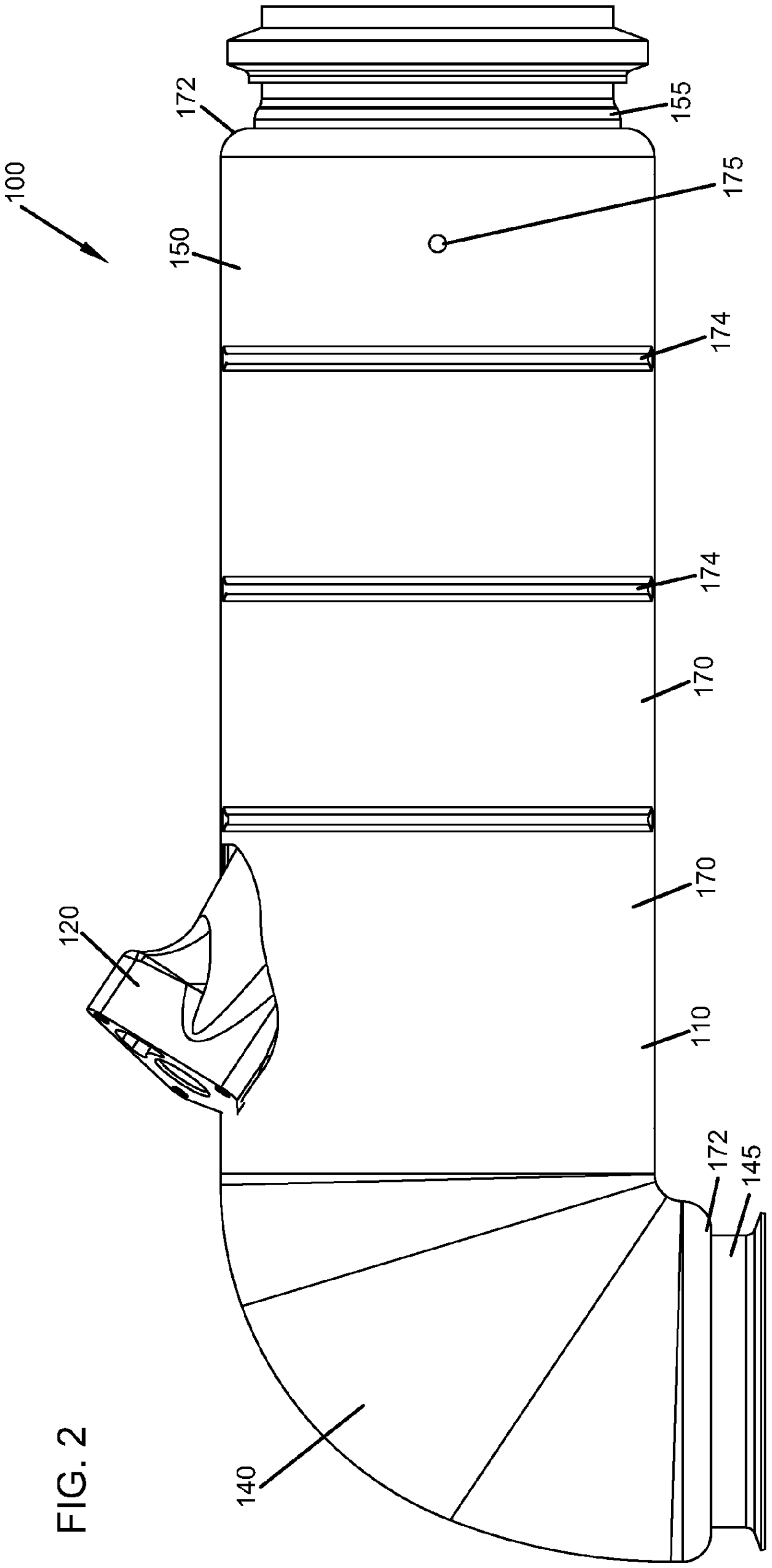
FIG. 2 is a side view of another embodiment of a detachable reductant decomposition reactor.

As the reactor 100 is formed using a welding method, the reactor 100 can be configured to attach different types and sizes of the inlet tube 140 and the outlet tube 150 to the middle tube portion 110. For example, as shown in FIG. 2, the inlet tube 140 is elbow shaped. Also, in some embodiments the reactor 100 is configured to attach the inlet tube 140 with a 4 inch diameter and the outlet tube 150 with a 5 inch diameter. The middle tube portion 110 of the reactor 100 can also be configured to any diameter to fit the engine size or mass flow rate of the exhaust traveling through the aftertreatment system.

In FIG. 1, the insulating layer 160 is provided to retain as much heat as possible within the reactor 100 to aid in decomposing nitrogen-oxide reductant in the exhaust stream. The insulating layer 160 is made up of a ceramic fiber in which higher temperature fibers are located closer to the outer surface of the middle tube portion 110, the inlet tube 140 and the outlet tube 150 during use of the reactor 100 in the aftertreatment system. The edges of the insulating layer 160 are coated with an erosion resistant material to prevent fiber migration during handling and use of the reactor 100.

The insulating layer 160 is further protected using the heat shields 170. The heat shields 170 surround an outer surface of the insulation layer 160 and are formed to compress and protect the insulation layer 160. The heat shields 170 include protective ends 172 to prevent any water from reaching the insulation layer 160. As shown in FIG. 2, the heat shields 170 include ribs 174 to lock the heat shields 170 into shape to ensure a good fit during production. The heat shields 170 also include an indexing hole 176 for indexing the heat shields 170 during production. The heat shields 170 can be made from a low grade, low cost material as they are not intended to be in direct contact with the reductant traveling through an aftertreatment system. In one embodiment the heat shields 170 are formed with 439 stainless steel. In other embodiments, for example, the heat shields 170 can be formed of 409 or 304 stainless steel.

Figure 3:
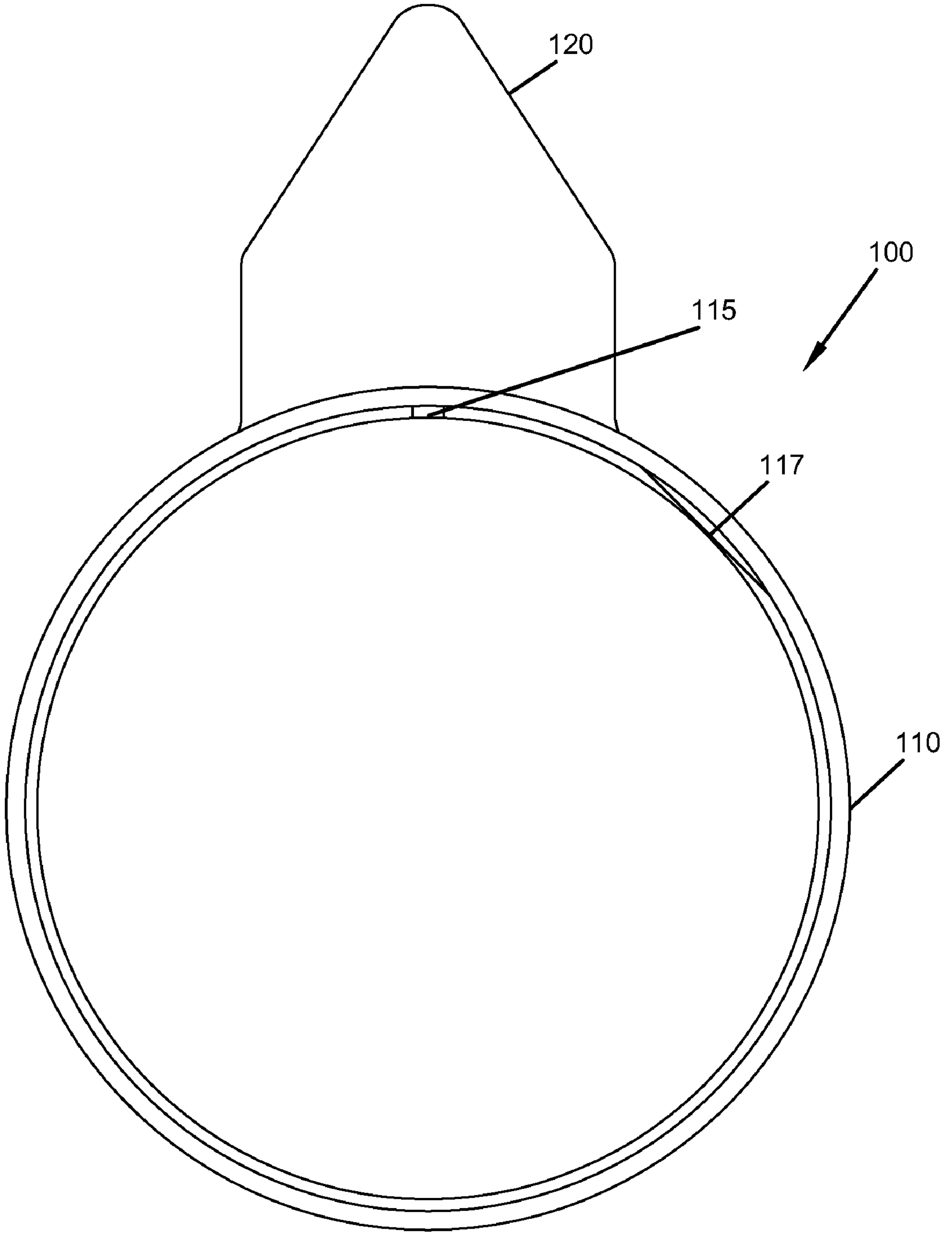
FIG. 3 is a front view of a middle tube portion of the detachable reductant decomposition reactor.

The mixer 130, shown in FIG. 1, can be similar to the mixer described in U.S. patent application Ser. No. 12/237,574, directed to a "REDUCTANT DECOMPOSITION MIXER AND METHOD FOR MAKING THE SAME". The mixer 130 is housed within the reactor 100 using a floating fit. A floating fit as described herein is defined as placing the mixer into the reactor without welding or casting the mixer into the reactor 100. As shown in FIG. 3, the location and orientation of the mixer 130 within the reactor 100 is fixed by a mixer indexing feature 115 cast into place at one end of the middle tube portion 110 near the outlet tube portion 150. The mixer 130 also includes a poke yoke orientation feature (not shown) that mates with a mixer orientation feature 117, thereby preventing the mixer 130 from being inserted backwards into the reactor 100 and allowing the mixer 130 to fit within the middle tube portion 110 without being welded or cast into place.

Figure 4A:
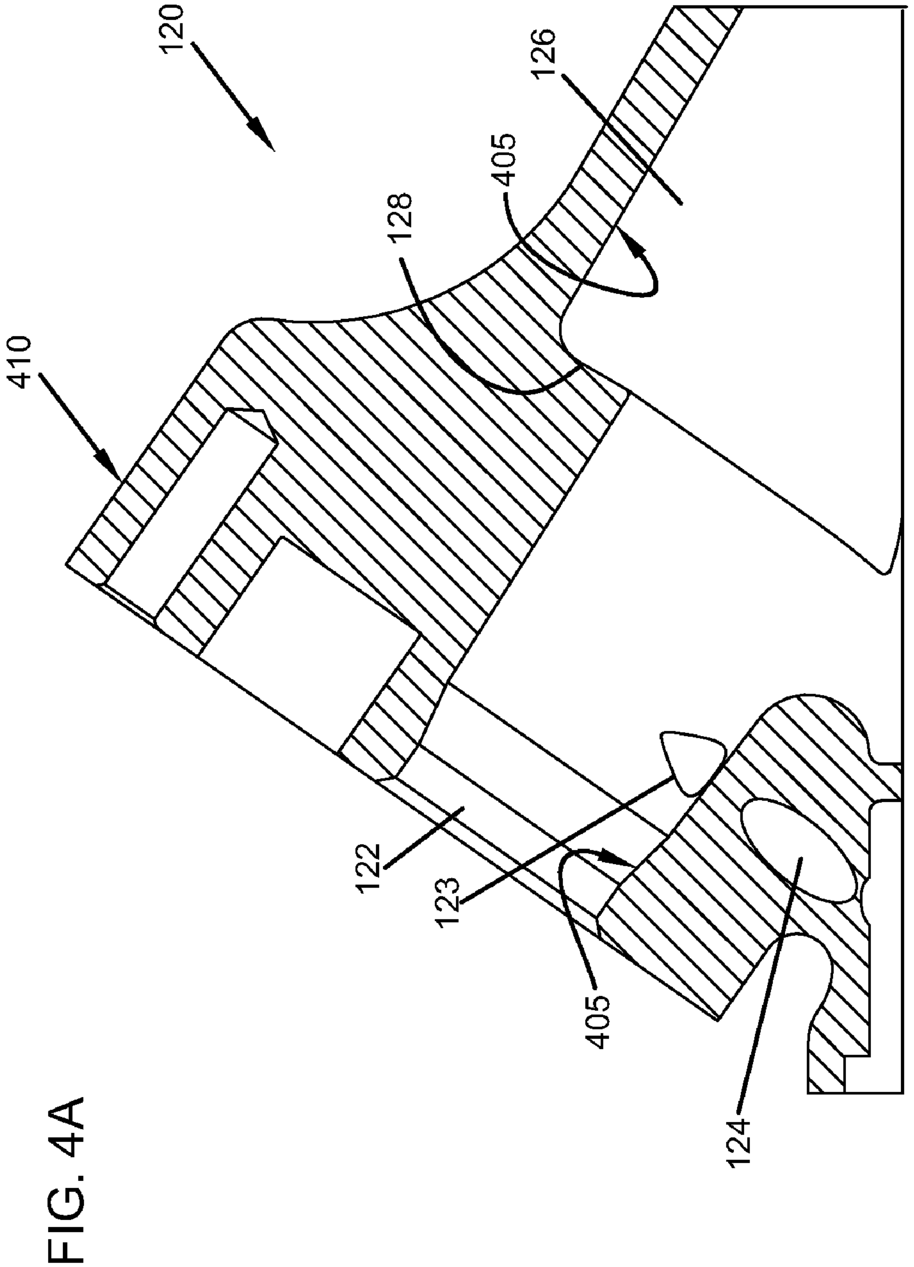
FIG. 4A is a cross-sectional view of the reductant injector mount formed using a casting method.

FIG. 4A is a cross-sectional view of the reductant injector mount 120 formed using a casting method. The injector mount 120 has an inner surface 405 and an outer surface 410. The injector mount 120 includes an injector port 122, a tube like section 124 and an injector chamber 126 that includes a hard edge 128. The injector mount 120 is configured to inject a reductant via the injector port 122 into the middle tube portion 110 (shown in FIG. 1). The injector mount 120 is oriented at an angle of approximately 35° with respect to the longitudinal axis 112 of the middle tube portion 110 (see FIG. 1) to ensure that the reductant travels through the reactor 100 and consequently through the aftertreatment system. In other embodiments, the angle of the injector mount 120 with respect to the longitudinal axis 112 can be varied between 0° and 45° to provide an optimal flow of the reductant through the reactor 100. By forming the injector mount 120 with the middle tube portion 110 using a casting method as opposed to welding an injector mount to a reactor, the angle of the injector mount 120 with respect to the longitudinal axis 112 can be reduced and welding distortions between the injector mount 120 and the middle tube portion 110 can be prevented.

Figure 4B:
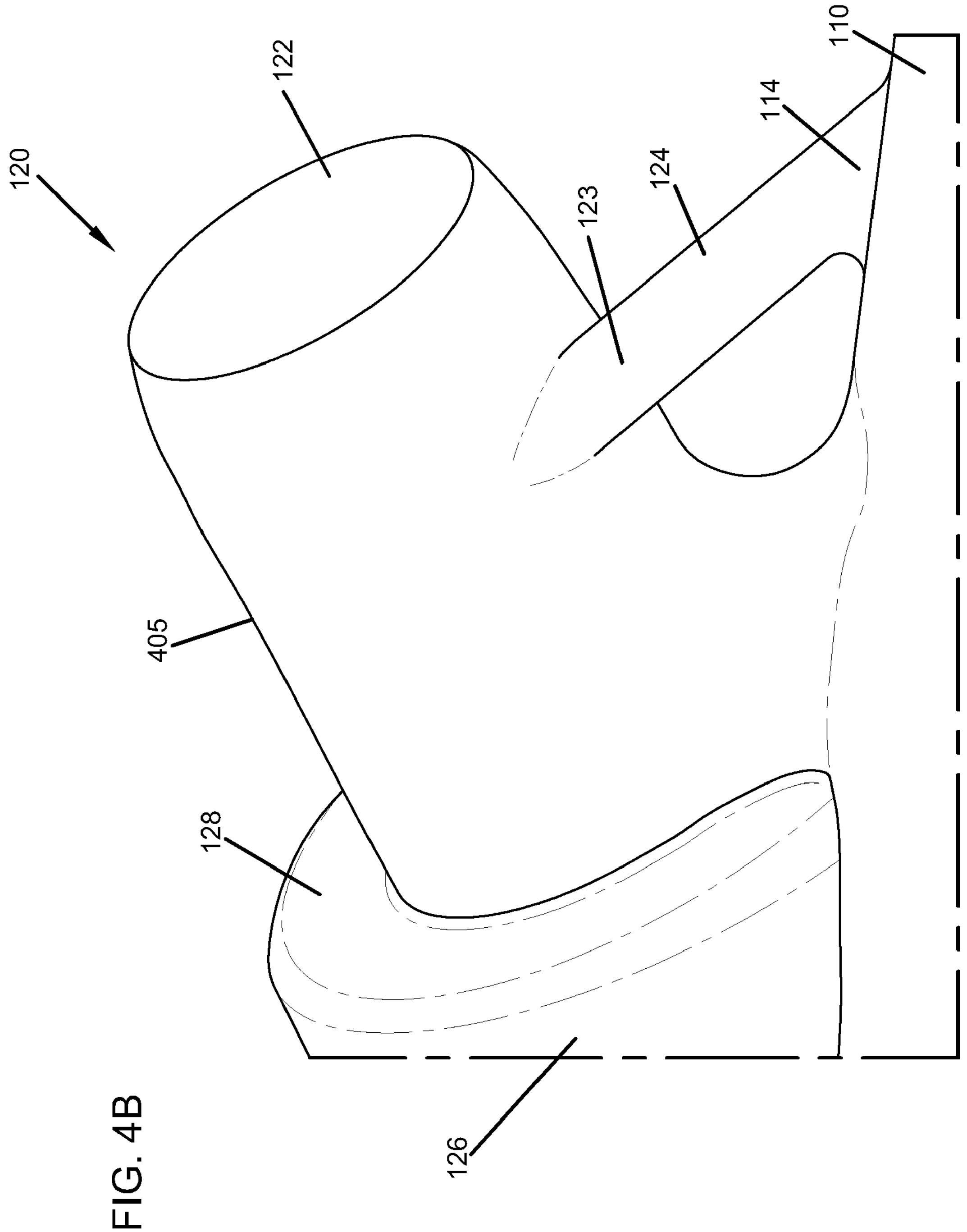
FIG. 4B is a perspective view of the inner surface of the injector mount formed using a casting method.
Figure 5:
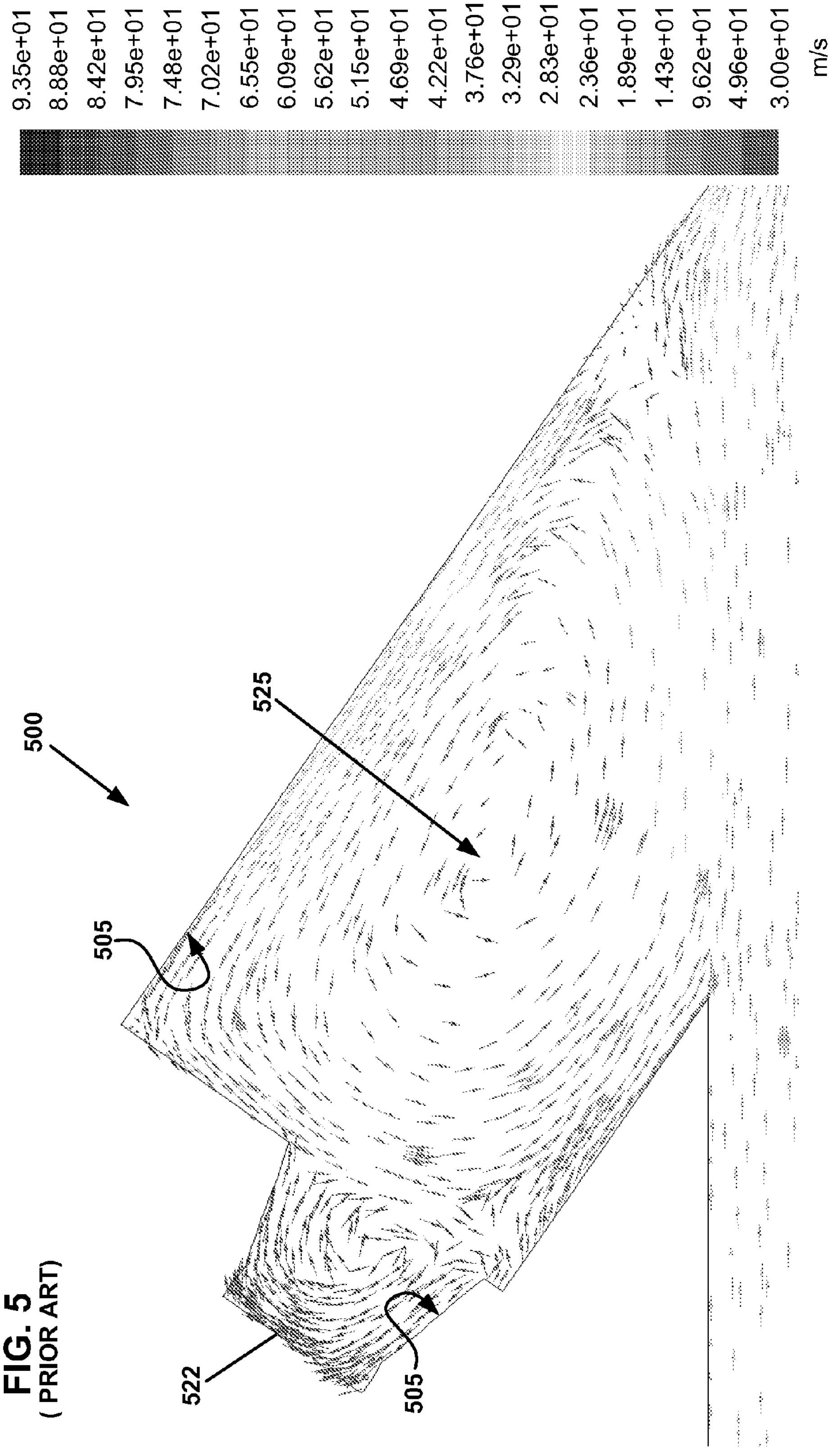
FIG. 5 ( PRIOR ART)
FIG. 5 is a velocity magnitude chart of a prior art injector mount from a side view of the injector mount.

FIG. 4B is a perspective view of the inner surface 405 of the reductant injector 120. As shown in FIG. 4B, the tube like section 124 is a cavity in the casting with a first opening 123 near the injector port 122 and a second opening 114 into the middle tube portion 110. The tube like section is formed to taper toward the middle tube portion 110. In some embodiments, the tube like section 124 is a contoured cavity. The diameter of the tube like section 124 can be varied depending on a variety of factors (e.g., the engine size, the mass flow rate of the exhaust through the aftertreatment system, the diameter of the reactor 100, the angle of the injector mount 120 with respect to the longitudinal axis 112, the distance from the injector mount 120 to the center of the middle tube portion 110, the maximum exhaust temperature, etc.). In the embodiment of FIG. 1, the diameter of the tube like section 124 is 5 mm. In operation, the tube like section 124 is configured to allow air to flow up near the injector port 122 to create a high velocity, downward spiraling flow pattern to carry fine particles of the reductant away from the injector mount 120. FIG. 5 is a velocity magnitude chart of a traditional injector mount 500. As shown in FIG. 5 without a tube like section, the injector mount 500 creates a large recirculation region 525 for reductant sprayed through an injector port 522. This large recirculation section 525 results in the reductant coming to rest as it travels along an inner surface 505 of the injector mount 500, resulting in the formation of reductant deposits along the inner surface 505 of the injector mount 500.

Figure 6:
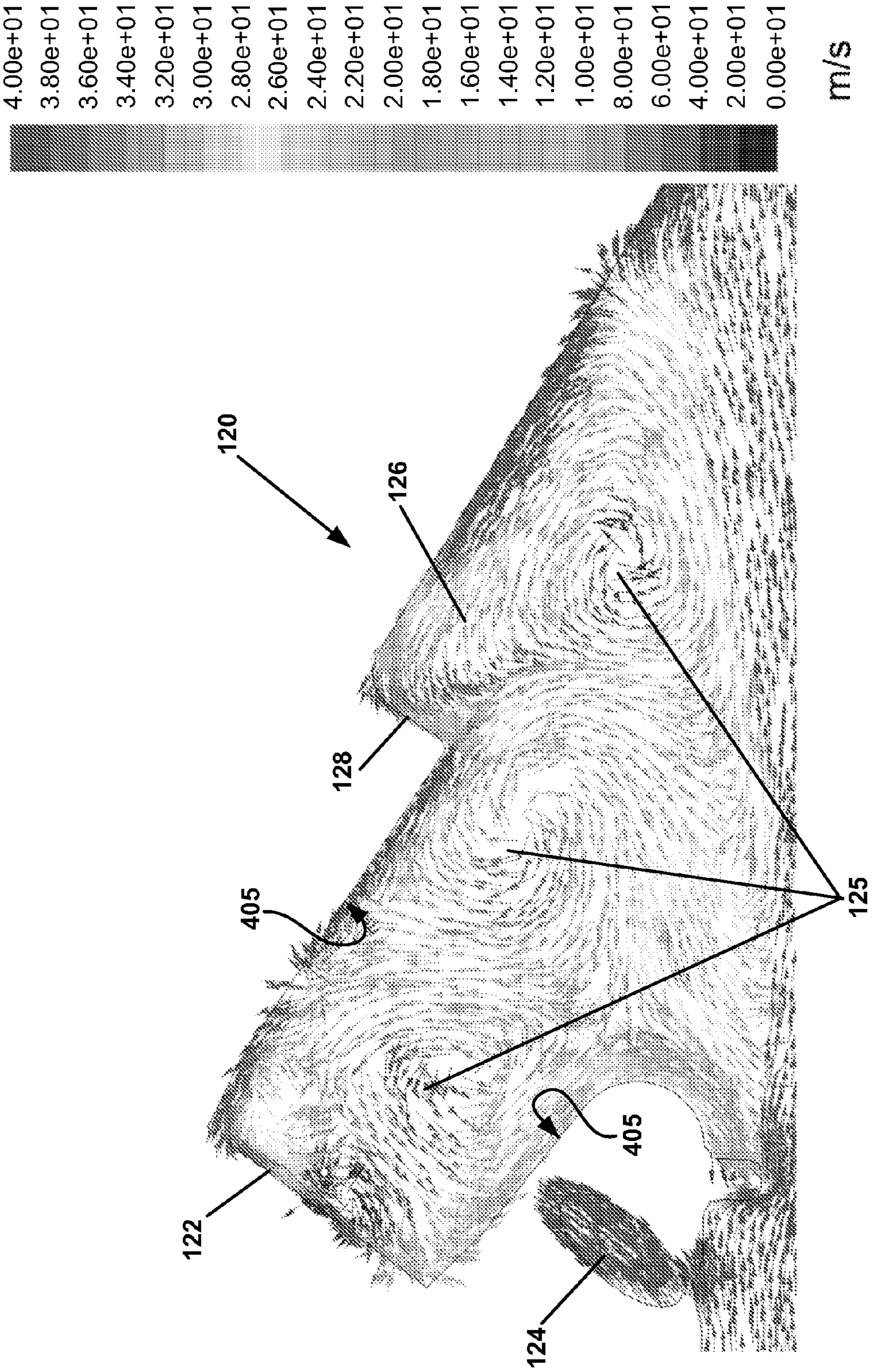
FIG. 6 is a velocity magnitude chart of the improved injector mount from a side view of the injector mount.

FIG. 6 is a velocity magnitude chart of the injector mount 120. As shown in FIG. 6, the tube like section 124 creates high temperature, high velocity flows along the inner surface 405 of the injector mount 120, thereby preventing the formation of reductant deposits along the inner surface 405 of the injector mount 120. Furthermore, the hard edge 128 is configured to help prevent the recirculation regions 125 from circulating the reductant back to the injector port 122. Accordingly, a higher percentage of the reductant entering the injector port 122 will travel through the chamber 126 into the middle tube portion 110 (not shown) and through the aftertreatment system.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A detachable reductant decomposition reactor comprising:

a middle tube portion formed with a reductant injector mount that is configured to introduce a reductant into the reactor;

an inlet tube formed at a first end of the middle tube portion that is configured to create a sealed connection to a first portion of an exhaust system;

an outlet tube formed at a second end of the middle tube portion that is configured to create a sealed connection to a second portion of the exhaust system; and a mixer fit at the second end of the middle tube portion adjacent to the outlet tube that is configured to decompose the reductant in an exhaust stream;

wherein the injector mount includes an injector chamber and a tube like section separate from the injector chamber, the injector chamber including a first end connected to the middle tube portion and a second end connected to an injector port, the tube like section including a first opening directly communicating with the middle tube portion and a second opening directly communicating with the injector port, the tube like section configured to reduce recirculation flow patterns in the reactor and reduce the formation of reductant deposits.

2. The reactor of claim 1, further comprising an insulating layer surrounding an outer surface of the middle tube portion and a portion of the inlet tube and a portion of the outlet tube.

3. The reactor of claim 2, further comprising a heat shield surrounding an outer surface of the insulating layer.

4. The reactor of claim 1, wherein the injector chamber includes a hard edge adjacent to the injector port that is configured to prevent reductant from flowing back to the injector port of the injector mount.

5. The reactor of claim 1, wherein the middle tube portion, the injector mount, the outlet tube portion and the mixer are formed with 904L stainless steel.

6. The reactor of claim 1, wherein the mixer is housed within the reactor using a floating fit.

7. The reactor of claim 1, wherein the inlet tube or the outlet tube is elbow shaped.

8. The reactor of claim 1, wherein the tube like section tapers toward the middle tube portion.

9. The reactor of claim 1, wherein the middle tube portion is welded to the outlet tube.

10. A detachable reductant decomposition reactor comprising:

a middle tube portion formed with a reductant injector mount that is configured to introduce a reductant into the reactor;

an inlet tube formed at a first end of the middle tube portion that is configured to create a sealed connection to a first portion of an exhaust system;

an outlet tube formed at a second end of the middle tube portion that is configured to create a sealed connection to a second portion of the exhaust system;

a mixer fit between the middle tube portion and the outlet tube that is configured to decompose the reductant in an exhaust stream; and an insulating layer surrounding an outer surface of the middle tube portion and a portion of the inlet tube and a portion of the outlet tube.

11. The reactor of claim 10, further comprising a heat shield surrounding an outer surface of the insulating layer.

12. The reactor of claim 10, further comprising an injector chamber with a hard edge adjacent to an injector port of the injector mount that is configured to prevent the reductant from flowing back to the injector port.

13. The reactor of claim 10, wherein the middle tube portion, the injector mount, the outlet tube portion and the mixer are formed with 904L stainless steel.

14. The reactor of claim 10, wherein the mixer is housed within the reactor using a floating fit.

15. The reactor of claim 10, wherein the inlet tube or the outlet tube is elbow shaped.

16. A detachable reductant decomposition reactor comprising:

a middle tube portion formed with a reductant injector mount that is configured to introduce a reductant into the reactor;

an inlet tube formed at a first end of the middle tube portion that is configured to create a sealed connection to a first portion of an exhaust system;

an outlet tube formed at a second end of the middle tube portion that is configured to create a sealed connection to a second portion of the exhaust system; and a mixer fit between the second end of the middle tube portion and the outlet tube that is configured to decompose the reductant in an exhaust stream;

wherein the injector mount includes an injector chamber with a hard edge adjacent to an injector port of the injector mount that is configured to prevent reductant from flowing back to the injector port.

17. The reactor of claim 16, wherein the middle tube portion, the injector mount, the outlet tube portion and the mixer is formed with 904L stainless steel.

18. The reactor of claim 16, wherein the mixer is housed within the reactor using a floating fit.

19. The reactor of claim 16, wherein the inlet tube or the outlet tube is elbow shaped.

* * * * *